US012792851B2

(12) United States Patent
Lavigne et al.

(10) Patent No.: US 12,792,851 B2
(45) Date of Patent: Nov. 10, 2026

(54) METHOD FOR MANAGING TURBINE ENGINE DEVICES USING AN ON-BOARD READER OF THE RADIO FREQUENCY IDENTIFICATION TYPE

(71) Applicant: SAFRAN AIRCRAFT ENGINES, Paris (FR)

(72) Inventors: Julie Valérie Clara Lavigne, Moissy-Cramayel (FR); Tony Alain Roger Joël Lhommeau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/729,833

(22) PCT Filed: Jan. 10, 2023

(86) PCT No.: PCT/FR2023/050033

§ 371 (c)(1),
(2) Date: Jul. 17, 2024

(87) PCT Pub. No.: WO2023/144480

PCT Pub. Date: Aug. 3, 2023

(65) Prior Publication Data

US 2025/0103833 A1 Mar. 27, 2025

(30) Foreign Application Priority Data

Jan. 27, 2022 (FR) ....................................... 2200721

(51) Int. Cl.
*G06K 7/10* (2006.01)
*B64F 5/60* (2017.01)
(Continued)

(52) U.S. Cl.
CPC ............ *G06K 7/10356* (2013.01); *B64F 5/60* (2017.01); *G06K 19/07758* (2013.01); *G06Q 10/087* (2013.01)

(58) Field of Classification Search
CPC ..... B64D 29/00; B64F 5/60; G06K 19/07758; G06K 7/10356; G06Q 10/087; G06Q 10/20; H04B 5/77; H04B 7/0617
See application file for complete search history.

(56) References Cited

U.S. PATENT DOCUMENTS

2001/0038354 A1* 11/2001 Gilboa .................. G01R 33/02 324/207.17
2005/0093678 A1* 5/2005 Forster ............ G06K 19/07796 343/700 MS (Continued)

FOREIGN PATENT DOCUMENTS

EP 2564229 A2 3/2013
WO 2011135328 A2 11/2011

(Continued)

OTHER PUBLICATIONS

Antonios Bouzakis et al., "Position Tracking for Passive UHF RFID Tags with the Aid of a Scanned Array," *International Journal of Wireless Information Networks,* U.S., vol. 20, No. 4, Jun. 23, 2013, pp. 318-327.

(Continued)

*Primary Examiner* — Omer S Khan
(74) *Attorney, Agent, or Firm* — Kilpatrick Townsend & Stockton LLP

(57) ABSTRACT

This method for managing devices installed in a nacelle of a turbine engine, the devices being provided with radio tags and the turbine engine being fitted with a radio frequency identification reader and with at least two time reversal antennae, comprises the following steps:

(Continued)

mapping the electromagnetic field inside the closed nacelle
matching the known position of the devices with the electromagnetic characteristics of their respective radio tags
carrying out an inventory by time reversal focusing of waves.

12 Claims, 6 Drawing Sheets

(51) Int. Cl.
*G06K 19/077* (2006.01)
*G06Q 10/087* (2023.01)

(56) References Cited

U.S. PATENT DOCUMENTS

2008/0012710 A1 1/2008 Sadr
2013/0147609 A1* 6/2013 Griffin ............... G06K 7/10356 340/10.5
2021/0375071 A1* 12/2021 Lhommeau ............ B64D 29/00
2022/0324645 A1* 10/2022 Yoshikawa ............. F25D 29/00

FOREIGN PATENT DOCUMENTS

WO 2011153328 A3 11/2011
WO 2017187092 A1 11/2017
WO 2020025882 A1 2/2020
WO WO-2020025881 A1 * 2/2020 ........... F01D 21/003

OTHER PUBLICATIONS

Wang-Sang Lee et al., "Quadruple-feed beam-controlled antenna array for the localisations of ultra-high-frequency radio-frequency identification tags" IET Microwaves, Antennas & Propagation, The Institution of Engineering and Technology, UK, vol. 9, No. 9, Jun. 18, 2015, pp. 923-932.
International Patent Application No. PCT/FR2023/050033, International Search Report and Written Opinion dated Apr. 6, 2023, 13 pages (3 pages of English translation and 13 pages of original document).

* cited by examiner

[Fig. 1]
| | |
|---|---|
| M11 | USER |
| M10 | TID |
| M01 | EPC |
| M00 | RESERVED |
[Fig. 2]
devices
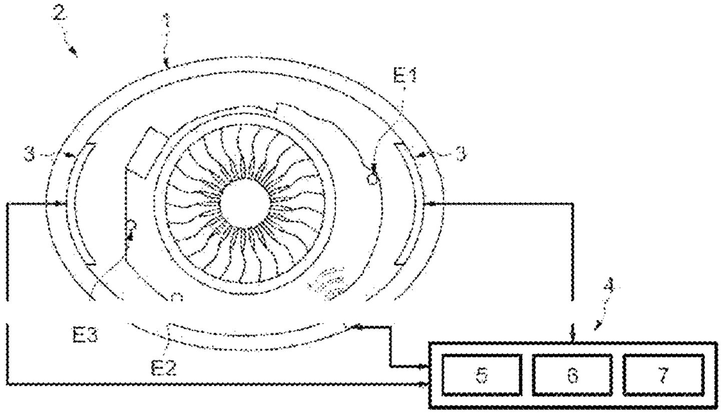
[Fig. 3]
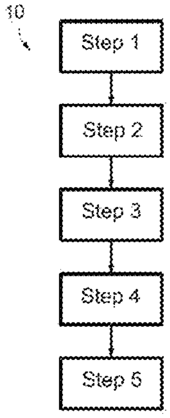

[Fig. 4]
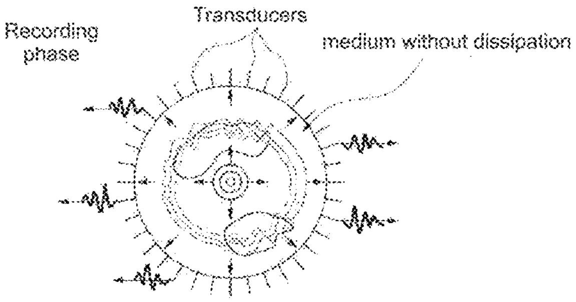
[Fig. 5]
| Tag identifier | Characteristics of the received signal |
|---|---|
| RFID20 | 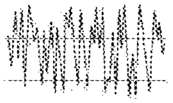 |
| RFID21 | 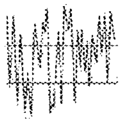 |
| RFID22 | 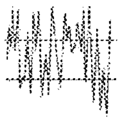 |

[Fig. 6]
| Tag identifier | Characteristics of the emitted signal | Devices |
|---|---|---|
| RFID20 | 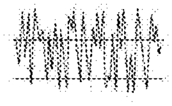 | E1 |
| RFID21 | 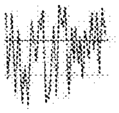 | E2 |
| RFID22 | 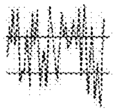 | E3 |
[Fig. 7]
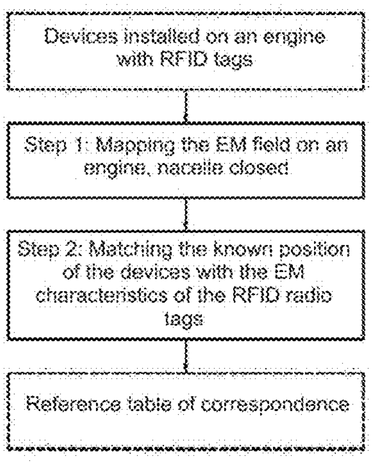

[Fig. 8]
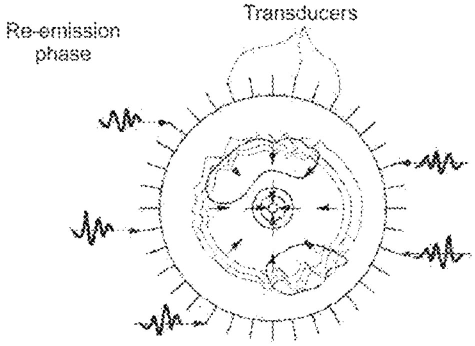
[Fig. 9]
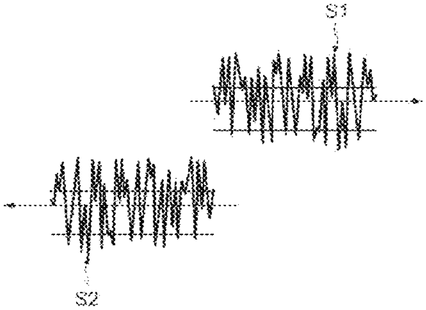

[Fig. 10]
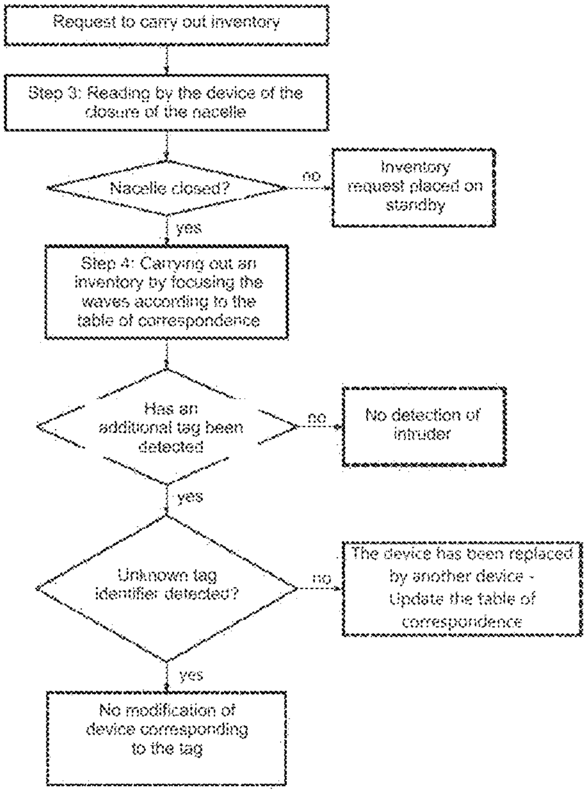

[Fig. 11]
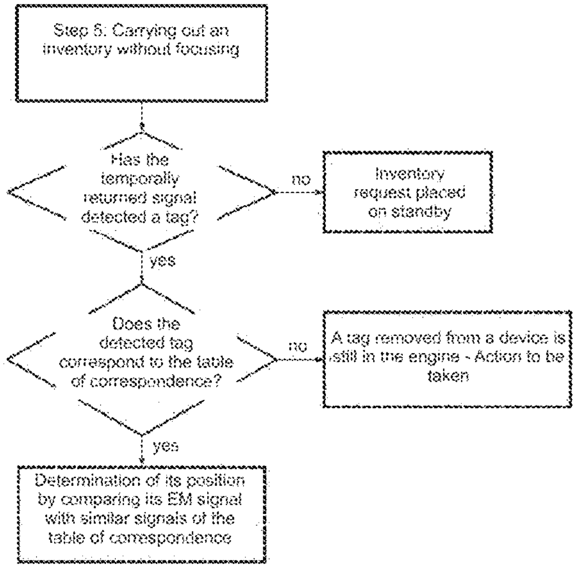

METHOD FOR MANAGING TURBINE ENGINE DEVICES USING AN ON-BOARD READER OF THE RADIO FREQUENCY IDENTIFICATION TYPE

CROSS REFERENCE TO RELATED APPLICATIONS

This application is a U.S. national phase under 35 U.S.C. § 371 of International Patent Application No. PCT/FR2023/050033, filed on Jan. 10, 2023, which claims priority to French Patent Application No. 2200721, filed on Jan. 27, 2022, the entire contents of both of which are incorporated herein by reference in their entireties.

TECHNICAL FIELD

The invention pertains to the field of maintenance, in particular of aircraft and, more precisely, to the field of monitoring parts mounted in a turbine engine.

More particularly, it relates to a method and a system for controlling parts making it possible to inventory parts and devices that may be replaced on site, also known under the acronym LRU (Line Replaceable Unit).

PRIOR ART

Airlines have the regulatory obligation of controlling the configuration of the engines of the aircraft that they use, as well as maintaining them.

The updating of documents relating to the parts mounted on the engine is manual and carried out by several independent maintenance operators. Entering the replacement of a device in the engine logbook may be effective after a delay of several days.

When maintenance inspections are scheduled in the workshop, it is usual to observe, during a preliminary inventory phase, that devices of the turbine engine or of the nacelle were removed from the engine before arriving in the workshop and to note that these modifications were not written in the maintenance logbook.

Thus, it is necessary to carry out the inventory of the devices actually mounted on the turbine engine, compare it with the list of parts communicated and report all of the non-conformities.

A known solution for performing inventories uses radio frequency identification (RFID).

Within the framework of inventories, RFID technology makes it possible to identify around one hundred items per second, without having to locate them and select them individually, as opposed to barcode technology (one-dimensional or two-dimensional).

However, the RFID inventory requires making sure that all of the radio tags that have responded belong to the items of which it is desired to carry out the inventory.

In order to locate radio tags, tags are generally used, consisting of radio tags having a known position, from which the position of other radio tags are estimated by triangulation, trilateration or multilateration. Nevertheless, these locating methods are not suitable for three-dimensional locating in a confined space such as a turbine engine, which has a heterogeneous medium and multiple-path wave propagation conditions.

When an inventory of devices or parts of the engine is carried out by RFID, it is desired to filter the elements to be inventoried and disregard the elements that must not be included in the inventory. In order to achieve this, the data stored in the memory of the radio tags is used. Conventionally, radio tags have a memory segmented into four logic blocks schematically shown in FIG. 1, namely: the block M00 that is reserved for safety data, the block M01 called "EPC" which stands for "electronic product code" that contains a unique identifier, the block M10 called "TID" which stands for "tag identifier", which is write protected and which contains data regarding the manufacturer of the radio tag (manufacturer, model, serial number), the block M11 corresponding to the user memory area or "USER".

The radio tags can be filtered according to the information written in one of the "EPC", "TID" or "USER" memory blocks.

For example, if it is desired to only identify the radio tags of "Engine 102", one of the "EPC", "TID" or "USER" memory blocks needs to contain the "Engine 102" information, in order to only keep the inventoried tags of the engine identified.

When the device has to be mounted on another engine, it will need to be made sure that this information is indeed up to date in the corresponding memory area. This is not possible for the "TID" block, write protected, but remains possible for the other two memory blocks, with a preference for the "USER" block of which the size is larger.

However, these known methods require having perfect control of the information previously written in the memory area of the radio tags and updating this information without error. The maintenance operations carried out quickly on the operation site (or "on-wing maintenance" in jargon) or in the workshop by service providers do not offer sufficient safety as regards the robustness required by the updates to be performed.

In addition, the reader of the "USER" block requires the "EPC" block to be read beforehand in order to make it possible to identify the radio tag. This additional read increases the duration of the inventory, all the more so when it is necessary to communicate individually with each of the radio tags to be inventoried.

DISCLOSURE OF THE INVENTION

In view of the foregoing, the object of the invention is to overcome the aforementioned drawbacks and make radio tag identification reliable.

The object of the invention is a method for managing devices installed in a nacelle of a turbine engine, the devices being provided with radio tags and the turbine engine being fitted with a radio frequency identification reader and with at least two time reversal antennae.

The method is characterised in that it comprises the following steps:

- mapping the electromagnetic field inside the closed nacelle;
- matching the known position of the devices with the electromagnetic characteristics of their respective radio tags; and
- carrying out an inventory by time reversal focusing of waves.

Advantageously, the method comprises a step of detecting the closure of the nacelle.

Advantageously, the method comprises a step of carrying out an inventory without time reversal focusing of waves.

Preferably, each device is provided with a single radio tag.

Preferably, the radio frequency identification reader has a maximum power of 4 W.

Advantageously, the radio frequency identification reader makes it possible to configure the time reversal antennae.

Advantageously, the radio frequency identification reader is provided with computing and control means controlled by on-board intelligence of the algorithm or artificial intelligence type.

Preferably, the air slots in the nacelle have dimensions smaller than a quarter of the wavelength used by the radio frequency identification reader.

Advantageously, the nacelle is provided with a device for detecting whether the nacelle is open or closed and configured to communicate with the radio frequency identification reader.

Preferably, the radio tags are passive and supplied by radio waves generated by the radio frequency identification reader in the UHF frequency band (860 to 960 MHz).

According to another aspect, the object of the invention is a system for managing devices installed in a nacelle of a turbine engine, the devices being provided with radio tags and the turbine engine being fitted with a radio frequency identification reader and with at least two time reversal antennae.

The management system is characterised in that it comprises means for mapping the electromagnetic field inside the closed nacelle, means for matching the known position of the devices with the electromagnetic characteristics of their respective radio tags, and means for carrying out an inventory by time reversal focusing of waves.

Advantageously, the management system comprises means for detecting the closure of the nacelle.

Advantageously, the management system comprises means for carrying out an inventory without time reversal focusing of waves.

According to another aspect, the object of the invention is a turbine engine including devices provided with radio tags and fitted with a radio frequency identification reader and with at least two time reversal antennae, characterised in that it comprises a management system as defined above.

Another object of the invention is an aircraft comprising a turbine engine as defined above.

BRIEF DESCRIPTION OF THE DRAWINGS

Other aims, features and advantages of the invention will appear upon reading the following description, given solely as a non-limiting example, and made with reference to the appended drawings wherein:

FIG. 1, which has already been mentioned, schematically shows the conventional segmentation of the memory of radio tags;

FIG. 2 schematically illustrates a sectional view of an aircraft turbine engine nacelle;

FIG. 3 shows a flow chart of an inventorying method according to the invention;

FIG. 4 schematically illustrates the recording phase of the time reversal method;

FIG. 5 schematically shows a table of correspondence between a received signal and the transmitter tag;

FIG. 6 schematically shows a table of correspondence obtained at the end of step 2 according to the invention;

FIG. 7 shows the flow chart for creating the reference table of correspondence according to the invention;

FIG. 8 schematically illustrates the re-emission phase of the time reversal method;

FIG. 9 schematically illustrates the characteristics of any first signal S1 and those of a second signal S2 that is time reversed in relation to the first;

FIG. 10 illustrates a flow chart of an inventory request with time reversal focusing according to the invention; and FIG. 11 illustrates a flow chart of an inventory request without time reversal focusing, according to the invention.

DETAILED DISCLOSURE OF AT LEAST ONE EMBODIMENT

FIG. 2 schematically shows a sectional view of a nacelle 1 of an aircraft turbine engine 2, which comprises two time reversal antennae 3 connected to a central processing unit 4.

Time reversal is a technique for spatially and temporally focusing a wave from the received signal in various points of the medium. This technique can be applied to any type of wave regardless of its frequency band, in other words it is usable for radio waves in the "ultra high frequency" or UHF frequency ranges, located between 860 and 930 MHz.

It should be noted that the time reversal technique works even better in a reverberant closed environment, since the waves reflect and diffuse into multiple paths.

Inside the nacelle, devices mounted on the turbine engine 2 are shown, such as E1, E2 or E3 each provided with an individual radio tag.

The central processing unit 4 comprises computing means 5, measurement means 6 and control means 7. The central processing unit 4 is also connected to a radio frequency identification reader 8.

An inventorying method 10 making it possible to carry out the inventory of devices mounted on a turbine engine 2 will now be described with reference to FIG. 3.

Such a method is particularly implemented by the central processing unit 4.

The method 10 begins with a step 1 during which the central processing unit 4 performs a mapping of the electromagnetic field inside the nacelle 1 of the turbine engine 2.

The mapping consists in recording the response of a radio signal at various positions of the turbine engine 2 using the antennae 3 and the radio frequency identification reader 8. This method makes it possible to characterise the electromagnetic field in the wave propagation medium. The principle of time reversal then makes it possible to send a wave that has been emitted into the medium back to its source. This method is particularly practical in that the antenna can communicate with the emitting sources located at focusing points obtained by time reversal.

FIG. 4 schematically illustrates the recording phase prior to the time reversal and that is used in step 1. A source located inside a cavity emits waves through a non-dissipative medium. The propagation of the waves is disrupted by the heterogeneity areas present in the medium. Transducers placed on board, all around the cavity, record the incident signals.

With at least two antennae 3 and a plurality of radio tags, it is possible to map the responses of the signals emitted at various unknown positions of the turbine engine.

In the case of the inventorying method 10, the radio tags are disposed at known locations of the engine. This mapping makes it possible to build a table of correspondence between a received signal and the transmitter tag, schematically shown in FIG. 5.

During the next step 2, matching the known position of the devices with the electromagnetic characteristics of the radio tags of which they are provided is established.

This step 2 consists in developing a data table that associates the characteristics of the responses of the signals emitted from a known position of the radio tags, to the identifiers of the radio tags and to the corresponding devices. FIG. 6 shows an example of a data table of this type.

FIG. 7 shows the flow chart for creating the reference table of correspondence. During a preliminary step, devices provided with radio tags are installed in a turbine engine 2. At the next step 1, the electromagnetic field of the turbine engine 2 is mapped, with the nacelle 1 being closed. During the following step 2, matching the known position of the devices with the electromagnetic characteristics of the corresponding radio tags is performed. The flow chart ends with the creation of a reference table of correspondence.

The table of correspondence makes it possible to optimise the inventory of devices, because the method makes it possible to point out an unreported device replacement. For example, if the device E1 provided with an RFID radio tag 20 is replaced with another device provided with another RFID radio tag 23, the latter (RFID 23) will emit a signal having the same characteristics as the RFID radio tag 20, provided that the two radio tags are at the same focusing point.

During the next step 3, the central processing unit 4 checks the closure of the nacelle and the stopping of the turbine engine 2.

In an alternative embodiment, the central processing unit 4 uses a nearby sensor (not shown), preferably without physical contact, using acoustic, light, infrared or radioelectric waves, making it possible to check that the covers of the nacelle are indeed closed and locked together. The sensor is configured to communicate to the radio frequency identification reader 8, the opening/closing status of the nacelle.

In another alternative embodiment, there are one or more reference radio tags, intended to remain permanently on the turbine engine 2. The radio frequency identification reader 8 knows the identifiers and the characteristics of the signals of these radio tags, as they are noted when the nacelle is closed. Before each inventory, the radio frequency identification reader 8 makes a read request only to these radio tags. If the signal emitted by these radio tags does not correspond to the characteristics of the signals noted with the closed nacelle, it is considered that the nacelle is open. Reciprocally, if the incident signals correspond to the signals noted with the closed nacelle, the method passes to the next step 4.

The stopping of the turbine engine 2 is checked by the radio frequency identification reader 8 using a vibration sensor of the piezoelectric type by comparing the measured value with a predetermined threshold value.

Step 4 makes it possible to carry out the inventory of the devices of the turbine engine 2 by time reversal focusing the waves recorded in step 1. This step consists in emitting the signal identified in step 1, by carrying out a time reversal, in order to send back a signal in the direction of the corresponding radio tag. The time reversal method makes it possible to send the reversed signal back to its source, even if the position of the source is not known. Thus, step 2 makes it possible to identify the position of the source.

Step 4 has the advantage of sending radio frequency waves only in the direction of the LRU devices that it is desired to inventory, which makes it possible to reduce the radiated power or improve the detection of the radio tags, at an equal radiated power. Apart from energy savings, step 4 particularly makes it possible to reduce the time needed for the inventory because the method limits the inventory to the relevant devices.

FIG. 8 schematically illustrates the time reversal re-emission phase used in step 4. The transducers placed on board, all around the cavity, emit the incident signals recorded in step 1 by reversing them temporally. The waves thus emitted propagate through the medium and focus, infine, at the location of the initial source.

FIG. 9 schematically illustrates a first signal S1 recorded at step 1 and a second signal S2 that is obtained at step 4, by temporally returning the signal S1.

FIG. 10 illustrates a flow chart of an inventory request with time reversal focusing. During the receipt of a request to carry out an inventory, the method performs step 3 of checking the closure of the nacelle 1.

If the means for detecting the closure of the nacelle 1 indicate that the nacelle 1 is open, the inventory request is placed on standby.

If the means for detecting the closure of the nacelle 1 indicate that the nacelle 1 is closed, the method passes to step 4 of carrying out an inventory by focusing the waves according to the table of correspondence.

During step 4, if the temporally returned signal does not detect a radio tag, it is considered that the radio tag is missing and the radio frequency identification reader 8 displays an alert message.

During step 4, if the detected radio tag does not correspond to the table of correspondence, it is considered that the device has been replaced by another device and the radio frequency identification reader 8 displays an alert message.

During step 4, if the detected radio tag corresponds to the table of correspondence, it is considered that the corresponding device is installed correctly in the turbine engine 2.

During the following step 5, an inventory is carried out without time reversal focusing, in order to detect any unreported devices, present in the configuration of the turbine engine 2. The radio tags of unreported devices emit signals having characteristics that can be compared with those of the signals listed in the table of correspondence in order to estimate the location of the radio tags not listed. The inventory without time reversal focusing makes it possible to detect anomalies or omissions when changing radio tags.

FIG. 11 illustrates a flow chart of an inventory request without time reversal focusing. If no radio tag is detected during step 5 of carrying out an inventory without time-reversal focusing, it is considered that there are no anomalies. In the case where a known radio tag is detected but that is not supposed to be present in the turbine engine 2, it is considered that there is an anomaly and the radio frequency identification reader 8 displays an alert message. In the case where an unknown radio tag is detected, its position in the turbine engine 2 is estimated by comparing the characteristics of its electromagnetic signal and those of similar signals of the table of correspondence and the radio frequency identification reader 8 displays an alert message concerning the estimated position of the unknown radio tag.

The inventorying method 10 also allows to make a more reliable use of device performance information that is stored in the memory of the corresponding radio tags, by guaranteeing that the data captured remotely by the radio frequency identification reader 8 are indeed those of the device considered.

The invention claimed is:

1. A method for managing a plurality of devices installed in a nacelle of a turbine engine, the method comprising the following steps:

mapping an electromagnetic field inside the nacelle after the nacelle is closed, wherein each device of the plurality of devices is provided with at least one radio tag, and wherein the turbine engine comprises a radio frequency identification reader with at least two time reversal antennae;

matching a known position of each device of the plurality of devices with electromagnetic characteristics of their respective radio tags; and carrying out an inventory by time reversal focusing of waves, wherein the nacelle comprises air slots having dimensions smaller than a quarter of a wavelength used by the radio frequency identification reader, and wherein the nacelle is provided with a detecting device for detecting whether the nacelle is open or closed, and wherein the detecting device is configured to communicate with the radio frequency identification reader.

2. The method according to claim 1, comprising a step of detecting a closure of the nacelle.

3. The method according to claim 1, further comprising a step of carrying out an inventory without time reversal focusing of waves after carrying out the inventory by time reversal focusing of waves.

4. The method according to claim 1, wherein each device of the plurality of devices is provided with a single radio tag.

5. The method according to claim 1, wherein the radio frequency identification reader has a maximum power of 4 W.

6. The method according to claim 1, wherein the radio frequency identification reader is configured to configure the time reversal antennae.

7. The method according to claim 1, wherein the radio frequency identification reader is provided with a control system.

8. The method according to claim 1, wherein the radio tags of the plurality of devices are passive and supplied by radio waves generated by the radio frequency identification reader in a UHF frequency band (860 to 960 MHz).

9. A system for managing a plurality of devices installed in a nacelle of a turbine engine, each device of the plurality of devices comprising at least one radio tag, and wherein the turbine engine comprises a radio frequency identification reader and with at least two time reversal antennae, the system comprising a control system configured to:

map an electromagnetic field inside the nacelle after the nacelle is closed;

match a known position of the plurality of devices with electromagnetic characteristics of their respective radio tags; and perform an inventory by time-reversal focusing of waves, wherein the nacelle comprises air slots having dimensions smaller than a quarter of a wavelength used by the radio frequency identification reader, wherein the nacelle further comprises a detecting device for detecting whether the nacelle is open or closed, and wherein the detecting device is configured to communicate with the radio frequency identification reader.

10. The system according to claim 9, wherein the control system is further configured to perform an inventory without time reversal focusing of waves after performing the inventory by time-reversal focusing of waves.

11. A turbine engine comprising:

the system according to claim 9; and a plurality devices provided with radio tags; and a radio frequency identification reader and with at least two time reversal antennae.

12. An aircraft comprising the turbine engine according to claim 11.

* * * * *